US008073844B2

(12) United States Patent
Bhesania

(10) Patent No.: US 8,073,844 B2
(45) Date of Patent: Dec. 6, 2011

(54) PRE-PURCHASE DEVICE INTEROPERABILITY VALIDATION

(75) Inventor: Firdosh K Bhesania, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 854 days.

(21) Appl. No.: 12/106,327

(22) Filed: Apr. 21, 2008

(65) Prior Publication Data

US 2009/0265333 A1 Oct. 22, 2009

(51) Int. Cl.
*G06F 7/00* (2006.01)
*G06F 17/30* (2006.01)

(52) U.S. Cl. ......................... 707/722; 707/758; 705/347

(58) Field of Classification Search ............... 705/26.62, 705/26.8, 26.7, 27.1, 347; 707/705, 736, 707/722, 758
See application file for complete search history.

(56) References Cited

U.S. PATENT DOCUMENTS

| | | | | |
|---|---|---|---|---|
| 6,266,649 | B1 * | 7/2001 | Linden et al. | 705/10 |
| 6,289,405 | B1 | 9/2001 | Movall et al. | |
| 6,334,110 | B1 * | 12/2001 | Walter et al. | 705/14.41 |
| 7,107,257 | B2 | 9/2006 | Iulo et al. | |
| 7,194,526 | B2 | 3/2007 | Kanemitsu | |
| 7,822,631 | B1 * | 10/2010 | Vander Mey et al. | 705/10 |
| 2001/0047356 | A1 | 11/2001 | Ren et al. | |
| 2004/0006618 | A1 | 1/2004 | Kasai et al. | |
| 2004/0172340 | A1 * | 9/2004 | Bishop et al. | 705/26 |
| 2006/0168372 | A1 | 7/2006 | Smith et al. | |
| 2006/0190350 | A1 | 8/2006 | Maas | |
| 2007/0067589 | A1 | 3/2007 | Mishra et al. | |
| 2007/0130626 | A1 | 6/2007 | Kato et al. | |
| 2007/0168571 | A1 | 7/2007 | Ramsey et al. | |

OTHER PUBLICATIONS

"Riolab(TM) Offers RapidIO(R) Device Interoperability Level-3 (DIL-3) Testing", Nov. 8, 2006, RIOLAB Corporation, pp. 4.
Yocom, et al., "VoIP Vendors Pass SIP Test", Aug. 27, 2001, Network World Inc., pp. 1-6.

* cited by examiner

*Primary Examiner* — Marc Somers

(57) ABSTRACT

An interoperability assessment between two or more devices can be based on the devices' specifications and on empirical evidence of interoperability. Comparisons between the devices' capabilities can provide an initial assessment of interoperability, which can be further supported, or contradicted, by empirical evidence. Interoperability determinations can leverage existing data collection, such as error reporting and user identities to obtain estimates of empirical usage of devices, and to provide for a level of automation for requesting users. Interoperability determinations can also be offered, with identity protection limitations, for users other than the requesting user to facilitate gift-giving or agent purchasing.

17 Claims, 3 Drawing Sheets

200
Interoperable? 210
Reference device specifications and, optionally, user identity 215
Same physical connectivity? 220 (no / yes)
Compatible protocols? 225 (no / yes)
Compatible software? 230 (no / yes)
Reference empirical data 235
Empirical data? 240 (no / yes)
Empirical data indicate interoperability? 245 (yes / no)
Devices not interoperable 250
Devices are interoperable 255
Devices are theoretically interoperable 260

PRE-PURCHASE DEVICE INTEROPERABILITY VALIDATION

BACKGROUND

Creating two or more devices which can interoperate with one another becomes increasingly difficult as the complexity of the devices increases. The difficulty of designing interoperable devices further increases when individual devices are designed by disparate entities. To reduce such difficulties, standards were created, the adherence to which would, at least in theory, provide for the interoperability of two or more devices. Thus, for example, any bolt conforming to a particular thread spacing standard can interoperate with any nut of the same size conforming to the same thread spacing standard. From a consumer's perspective, the standard, and the conformance of a device to the standard, provided an assurance of interoperability. Consequently, a consumer having, for example, a bolt conforming to a particular thread spacing need only search for a nut of the same size conforming to the same thread spacing to be assured that the two would, in fact, interoperate.

In the computer science arts, any given device can comprise multiple layers of both hardware and software, adding further difficulty to the task of designing interoperable devices. The traditional reliance on standards does not alleviate the difficulty, because of the myriad of standards created for such multiple layers. More significantly, from a consumer's perspective, even learning of the standard, to know what to look for, can be daunting, given the quantity of relevant standards in existence. Furthermore, even once the consumer has learned about the relevant standards, various nuances can exist which, if the consumer is not aware of them, can result in the purchase of two products that the consumer believes to be interoperable, but which are not, in fact, interoperable. For example, a wireless music player and a pair of wireless headphones can both indicate support for a common wireless communication standard. However, the wireless headphones can support an aspect of the communication standard that provides for stereo communications while the wireless music player may only support an aspect of the communication standard that provides for mono communications. A consumer, having bought both of these devices expecting interoperability based on the devices' indication of support for a common standard, would be understandably displeased in obtaining only mono sound from the stereo-capable headphones.

Attempting to communicate each aspect of a supported standard through, for example, product advertising or packaging, such as via "Experience Icons" displayed on such advertising and packaging, may result only in further consumer confusion. More complex devices, such as the ubiquitous personal computer with a common operating system, can support so many standards and aspects of standards that any retail packaging or marketing of such a product would be quickly overwhelmed with nothing but indicators of such support.

Because a consumer is not likely to purchase a product whose interoperability is confusing, merchants have attempted to encourage consumer spending by providing a list of compatible peripheral products for a primary product already owned by the consumer. In particular, merchants have provided to consumers lists of memory expansion products that are physically compatible with a personal computer selected by the consumer. While such lists were feasible when most devices required a personal computer to be fully operational, more modern products seeking to interoperate with other computing devices, including cellular telephones, televisions, automobiles, and other computing devices, render such lists highly impractical. Indeed, even the lists of compatible peripheral products that were offered provided only a listing of physically compatible memory expansion products based on nothing more than a search for the physical requirements of memory expansion products that can be accepted by the consumer's personal computer. Furthermore, such systems are mono-directional in that they only identify compatible memory expansion products once the consumer has already specified a single, specific, personal computer for which they are shopping.

SUMMARY

Users and consumers of modern computing devices, including the ubiquitous personal computer, but also including more function-specific computing devices, such as music players or telephones, likely already have made use of features that can be leveraged to provide such users and consumers with more accurate, and yet simpler, interoperability information. For example, many users have online profiles that either can, or already do, track, to at least some extent, the computing device and peripherals that the user owns. Similarly, many users already submit automatic error reports when prompted to do so by mechanisms executing on their computing devices. Furthermore, many users have already become accustomed to searching for interoperability information via network connections to groups of other users and many users will even provide their own personal interoperability-related experiences to aid other users.

In one embodiment, device specifications, including official specifications obtained from device manufacturers and unofficial specifications obtained from other sources, can be collected together with user identity information, such as information regarding devices the user already owns, and empirical interoperability data, including user-provided empirical interoperability data and automatically collected data, to provide an interoperability assessment of any two or more devices. The device specifications, empirical interoperability data and user identity information can be centrally retained, or it can be maintained by multiple parties and polled as needed. Upon receipt of a specification of two or more devices for which an interoperability assessment is requested, the device specifications and empirical data can be referenced to provide the interoperability assessment.

In another embodiment, an interoperability assessment can initially reference the device specifications to determine the extent to which the two or more devices for which the interoperability assessment was requested support common standards. Such a determination can reference physical standards, communication standards and software standards. Subsequently, empirical data can be referenced to determine if there is any empirical evidence of interoperability.

In yet another embodiment, the specification of two or more devices for which an interoperability assessment is requested can be made with reference to a unique device identifier, such as a bar code value, a radio frequency identifier or other like identifying information. Such information can be manually entered by the user, or it can be automatically derived from raw data provided by the user, such as a digital image of a bar code or a digital transmission of the radio frequency identifier provided by the device.

In a further embodiment, existing user identity information can be leveraged to provide one or more users a comprehensive interoperability assessment of a considered device. The user identity information can comprise an identification of devices currently owned, or purchased by, the user, which can be leveraged to provide an interoperability assessment between one or more of those devices and a new device being considered by the user, thereby providing the user with an indication of which, if any, of the user's current devices, are expected to be interoperable with the new device. Alternatively, such user identity information can also be leveraged to provide an interoperability assessment between devices of disparate users, enabling one user to determine whether a contemplated device would be interoperable with one or more other devices of another user.

In a still further embodiment, automatically collected data, such as data from automated error reporting, that can include information regarding the use of devices among a statistically significant number of users, can be leveraged to enhance the empirical interoperability data. In particular, empirical evidence of interoperability problems can be offset by automatically collected data that can reveal that the two or more devices at issue are being used by others without evidence of interoperability problems. A weighted score, or percentage value, can be provided to inform of the potential for interoperability issues. In addition, user-provided data, such as technical specifications or empirical evidence of interoperability can be flagged as such to account for possible deceit. Prior-action-based trust systems, such as user feedback ratings, or similar mechanisms can be used to further elucidate the user-provided data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the provision of interoperability assessments between two or more devices. Device specifications can be referenced to determine interoperability based on multiple factors, including physical connection compatibility, communication protocol capability, and software capabilities. Subsequently, empirical data can be referenced to identify evidence confirming, or contradicting, a theoretical interoperability assessment. Existing services, such as automated error reporting databases, or user identity databases can be leveraged to provide ease of use and greater accuracy.

The techniques described herein focus on, but are not limited to, the provision of interoperability assessments within the context of purchasing decisions or troubleshooting. As such, the techniques described leverage centrally collected information from one or more sources, such as would be available through one or more of the myriad of network communications known in the art. The techniques described, however, are equally applicable to other scenarios, including scenarios where network communications may not be practical. For example, the techniques described can be locally provided on a single device as an extension of known plug-and-play mechanisms. Consequently, while the below descriptions will be in the context of user-directed inquiries that utilize network communications, the techniques described are not limited to such environments.

Figure 1:
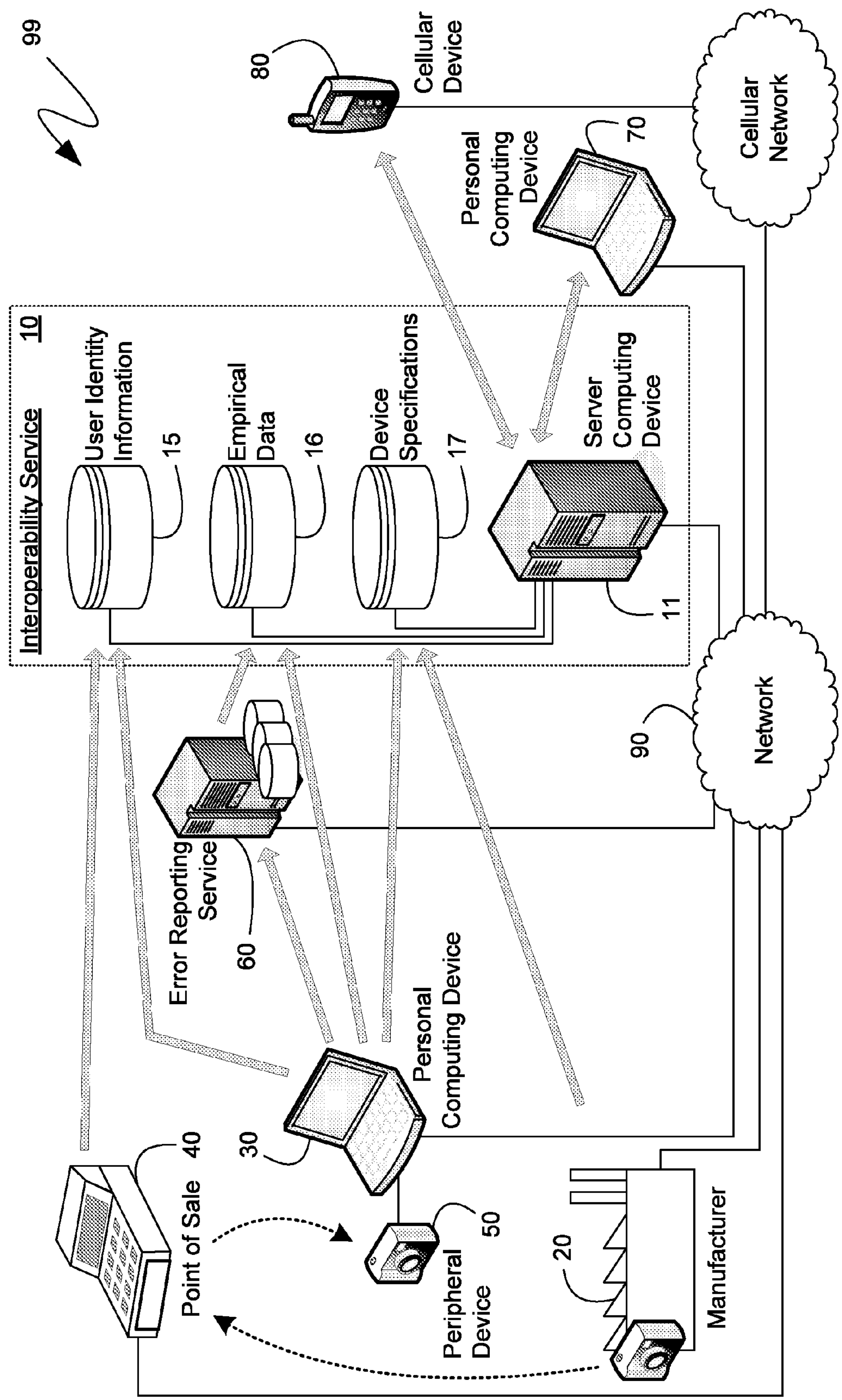
FIG. 1 is a block diagram of an exemplary system providing interoperability assessments.

Turning to FIG. 1, an exemplary system 99 is illustrated comprising an interoperability service 10, computing devices 30, 70 and 80 that can provide information to, and otherwise utilize, the interoperability service and a manufacturer 20, a point of sale 40, and an error reporting service 60 that can provide information to the interoperability service 10. In the illustrated embodiment, the interoperability service 10 can comprise one or more collections of data, including user identity information 15, empirical data 16 and device specifications 17 and a server computing device 11 for receiving, processing, accessing and analyzing that data. For convenience only, user identity information 15, empirical data 16 and device specifications 17 are illustrated in FIG. 1 as separate databases. However, as would be obvious to those skilled in the art, there is no structural difference between these sets of information that would, in any way, preclude their collection, storage and access in a myriad of other configurations, such as within a single database, or spread among multiple data collections, whether co-located or not.

The interoperability service 10, the computing device 30, 70 and 80, the manufacturer 20, the point of sale 40 and the error reporting service 60 can each be communicationally coupled to one another through the network 90. As shown in FIG. 1, the interoperability service 10 can receive information from a variety of sources, including from manufacturer 20, the point of sale 40, the user themselves, such as through the personal computing device 30, or from a third-party data collection service, such as the error reporting service 60.

The manufacturer 20 can provide, for example, device specifications for a device, such as the peripheral device 50, that the manufacturer has designed. Alternatively, or in addition, a user of the peripheral device 50, or a reviewer or enthusiast can likewise provide device specifications for a device, such as the peripheral device 50, via the personal computing device 30. In one embodiment, device specifications provided from a potentially untrustworthy source, such as a source other than the manufacturer 20, can be identified as such to provide a user of the interoperability service 10 with an appropriate caveat regarding reliance on such specifications.

Device specifications can be stored by the interoperability service 10 as device specifications 17 and can, in particular, comprise information that can aid, or establish, the interoperability between any two or more devices. In one embodiment, device specifications 17 can include an indication of a device's compliance with a specific industry standard and any applicable classes of that standard or regional or regulatory differences of that standard. For example, the device specifications 17 can indicate that a device supports the well-known Bluetooth® standard and, more specifically, that the device supports a particular class, such as the Advanced Audio Distribution Profile (A2DP), which indicates that the device can provide high quality audio support to other devices that similarly support the A2DP of the Bluetooth® standard. As will be known by those skilled in the art, a particular standard, such as the Bluetooth® standard, can be divided into classes that are generally enabled via additional matching software on both interoperable devices. Such classes (or profiles as they are referred to in Bluetooth®) can be, at least colloquially, identified by the types of devices that are intended to support that class, including, for example, headsets, keyboards, printers and the like. As will also be known to those skilled in the art, many global standards comprise regulatory or regional differences, including, for example, differences between geographical regions and differences between governmental requirements. For example, devices that utilize a common wireless standard may, in fact, utilize different frequency spectrums in accordance with the governmental frequency spectrum regulations of the country for which each device was designed. Similarly, some devices are specifically limited to particular geographic regions, such as digital versatile disk (DVD) players, which are traditionally limited to interoperate only with DVDs from a specific region, such as the North American region, or the European region. The identification of supported classes and regional and regulatory distinctions in the device specifications 17 can aid in the interoperability assessment provided by the interoperability service 10.

Device specifications 17 can also identify a device's cable and connector formats, such as an identification that a device includes a Universal Serial Bus (USB) connection, and, more specifically, that the physical connector provided is a mini-B USB connector. While in some cases, the specific connector may not directly impact interoperability, other connectors can provide interoperability limitations. For example, mini-B USB connectors may not be capable of accepting a sufficient amount of power for certain bus-powered devices, such as external hard drives. Similarly, a small portable device may include one or more USB connectors, but it cannot source a sufficient amount of power for other USB-compliant devices, such as a USB keyboard.

The device specifications 17 can further comprise an identification of drivers or other software information, such as listings of specific incompatibilities or specific errors or errata that exist in some hardware or software that prevent the device from interoperating. For example, certain peripheral devices can be known to require a particular version of an operating system, or other related software or other components, for proper interoperability. Similarly, some devices, such as video tuner devices, may not interoperate properly if another such device is already attached. By including such specific information in the device specifications 17, a manufacturer 20, or a user through a personal computing device 30, can enable the interoperability service 10 to provide a more accurate interoperability assessment.

In addition to the device specifications 17, the interoperability service can likewise collect empirical data 16, which can be submitted by users, such as through the personal computing device 30, or which can be obtained from other relevant data stores, such as the error reporting service 60. In one embodiment, empirical data 16 can comprise data submitted by users, which can be as simple as a listing of two or more devices and an indication of the interoperability between those two or more devices. Alternatively, additional information can be provided by the users, or even specifically requested by the interoperability service 10. For example, a user can be provided, via the personal computing device 30, with a form or other prompting for specific information that can be useful in assessing interoperability between two or more devices, including, for example, a request for an identification of the specific versions of the two or more devices for which the user is providing empirical data, the communicational mechanisms used to couple the two or more devices, and an identification of any special steps the user may have had to perform or had attempted to perform.

User-submitted empirical data has the potential to be inaccurate, even maliciously. Consequently, in one embodiment, user-submitted data can be marked as such to enable the interoperability service 10, or even recipients of interoperability assessments, the ability to appropriately discount such empirical data, should it not meet a par to prove it statistically significant. In an alternative embodiment, user-submitted empirical data can be identified with a reliability rating, or other similar rating, that can be assigned to users that have previously provided reliable and accurate empirical data. The rating can be provided by the interoperability service 10 itself, such as based on previously submitted empirical data that was verified by the interoperability service to be accurate, or the rating can be provided by other users of the interoperability service based on their own independent assessments of the previously provided empirical data.

In addition to user-submitted data, the empirical data 16 can further comprise data that can be obtained from, or maintained by, a data-gathering service that provides other functionality, such as an error reporting service 60. As will be known by those skilled in the art, many operating system and other software manufacturers implement error reporting services in order to automatically collect relevant information regarding errors that can aid in identifying, diagnosing, and correcting any software-related, or software-exacerbated, flaws. Such error reporting services traditionally collect information regarding communicationally coupled devices, since such devices can influence, and potentially even cause, the error being reported. In one embodiment, the information regarding communicationally coupled devices can be used by the interoperability service 10 as empirical evidence of the interoperability of two or more devices. For example, multiple error reports that indicate that the reporting device is coupled to a peripheral device can be evidence that the peripheral device is interoperable with the reporting device, since a user would not likely retain peripheral devices that did not interoperate with the reporting device. Of course, if the reported error was caused by the peripheral device, or otherwise explicitly indicated an interoperability problem, then, obviously, the error report could be evidence that the peripheral device is not interoperable with the reporting device.

In another embodiment, the empirical data 16, including any data obtained from external sources, such as the error reporting service 60, can be used to provide a percentage interoperability success rate. The error reporting service 60, or similar collection of data, can provide a sufficient amount of empirical data with which to extrapolate estimates across a population of users. Thus, if, for example, 10% of the reports from the error reporting service 60 included information that indicated a particular printer was coupled to the computing device submitting the error, an extrapolation can be made that approximately 10% of the users who have a computing device similar to that submitting the error also likely own that particular printer. For common computing devices, such empirical evidence can suggest that many thousands of users likely own the printer in question. Consequently, even if several dozen users provide empirical data indicating that the printer is not interoperable with that computing device, such empirical data can be discounted in light of the extrapolation that thousands of users own the printer.

While the device specifications 17 and the empirical data 16 can provide the input data with which the interoperability service 10 can provide interoperability assessments regarding any two or more devices, additional data, such as the user identity information 15 can be leveraged to provide an ease-of-use for users of the interoperability service 10. The user identity information 15 can retain information regarding the devices that a user already owns or has previously owned, thereby enabling a user to more easily request and obtain an interoperability assessment of a currently contemplated device. For example, a user whose current devices are already enumerated in the user identity information 15 need only provide an identification of a considered device in order to obtain, from the interoperability service 10, an interoperability assessment of the considered device with each of the user's other devices. Such a comprehensive interoperability assessment can identify interoperabilities that the user may not have considered, and can further inform the user's purchasing or device-management decisions. For example, a user contemplating a headset for their cellular telephone may learn, from a comprehensive interoperability assessment, that while the considered headset is interoperable with the user's cellular telephone, it may not be interoperable with the user's computing device. Thus, while the user may not have intended to use the considered headset with their computing device, the user may nevertheless choose an alternative headset to retain interoperability with both their cellular telephone and their computing device, thereby avoiding the need to later purchase another headset should the user later wish to use such a device in conjunction with the user's computing device.

In one embodiment, the user identity information 15 can be populated by users themselves through personal computing devices, such as personal computing device 30. The personal computing device 30 can provide an interface by which a user can enter some or all of the devices that the user owns, or has access to, or for which the user would otherwise wish to receive interoperability assessments. The interface can leverage existing information to aid the user's entry of such information. For example, the interface can leverage existing product identification databases to guide the user to an accurate identification of a device the user wishes to include as part of their identity. Alternatively, the user could be prompted to provide, for example, a digital image of a Universal Product Code (UPC) or a reading of the Radio Frequency IDentification (RFID) or Near Field Communication (NFC) tag on a device and the interface could leverage existing UPC or similar databases to uniquely identify the product.

In an alternative embodiment, the user identity information 15 can be automatically updated, such as by information available from one or more points of sale, such as a point of sale 40. For example, many points of sale, including regional and national "brick-and-mortar" stores, and online shopping destinations, implement loyalty programs or otherwise track a user's purchases. Such purchase information can be made available, at the user's request, to an interoperability service 10, to enable the user identity information to be automatically updated with new devices whenever the user purchases such a device.

Even if the user does not have any device information saved in a user identity, the interoperability service 10 can still provide an assessment of the interoperability between two or more devices specified by a user. Such an interoperability assessment can be based on the device specifications 17 and the empirical data 16, as analyzed by one or more computing devices associated with the interoperability service 10, such as the server computing device 11. Although not required, the descriptions below will be in the general context of computer-executable instructions, such as program modules, being executed by one or more computing devices, such as the server computing device 11. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 2:
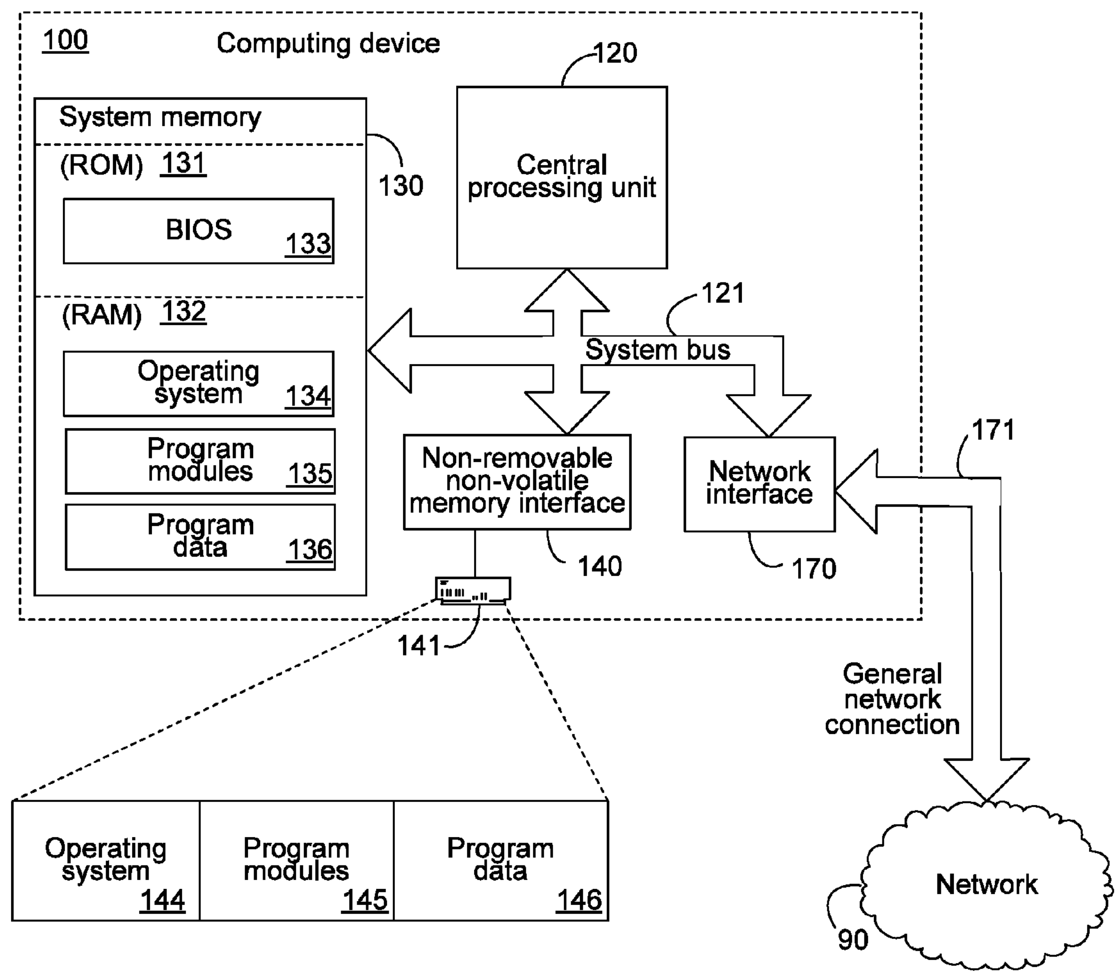
FIG. 2 is a block diagram of an exemplary computing device.

With reference to FIG. 2, an exemplary computing device 100 is illustrated, which can perform some or all of the actions attributed to the server computing device 11, the personal computing devices 30 and 70, the cellular device 80, or any of the other computing devices of FIG. 1. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Of relevance to the descriptions herein, the computing device 100 may operate in a networked environment using logical connections to one or more remote computers. For simplicity of illustration, the computing device 100 is shown in FIG. 2 to be connected to the network 90 of FIG. 1, which is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Turning back to FIG. 1, the interoperability service 10 can be contacted by a user through a computing device, such as through a portable computing device 70 or cellular device 80, and an interoperability assessment can be requested. As indicated previously, an interoperability assessment can be requested between two or more specified devices, or an interoperability assessment can be requested between a specified device and one or more other devices specified in the user identity information 15. In one embodiment, rather than referencing user identity information 15 for the requesting user, the interoperability service 10 can reference another user's identity information. For example, a user seeking to buy a gift for another user, or a system administrator seeking to purchase a device for the use of a particular user or group of users, can request that the interoperability service 10 provide an interoperability assessment of a specified device and the devices associated with those other users in the user identity information 15. To protect such other user's privacy, the interoperability service 10 can, in a situation where one user is requesting an interoperability assessment referencing another user's devices, provide a binary indication of interoperability, or a suggestion of a more interoperable alternative, without revealing the other devices associated with the other user.

In requesting an interoperability assessment from the interoperability service 10, a user can identify the relevant devices using multiple forms. For example, a user can identify a device via a product or marketing name, a product identifier, such as would be assigned by a manufacturer or a retailer, or even via a digital image of a UPC label, such as could be taken by a cellular device 80 while the user was shopping for the device. The server computing device 11 can, subsequently, identify the one or more devices referenced by the user and provide an interoperability assessment using the device specifications 17, empirical data 16 and, if appropriate, user identity information 15 and other internal or external data sources.

Figure 3:
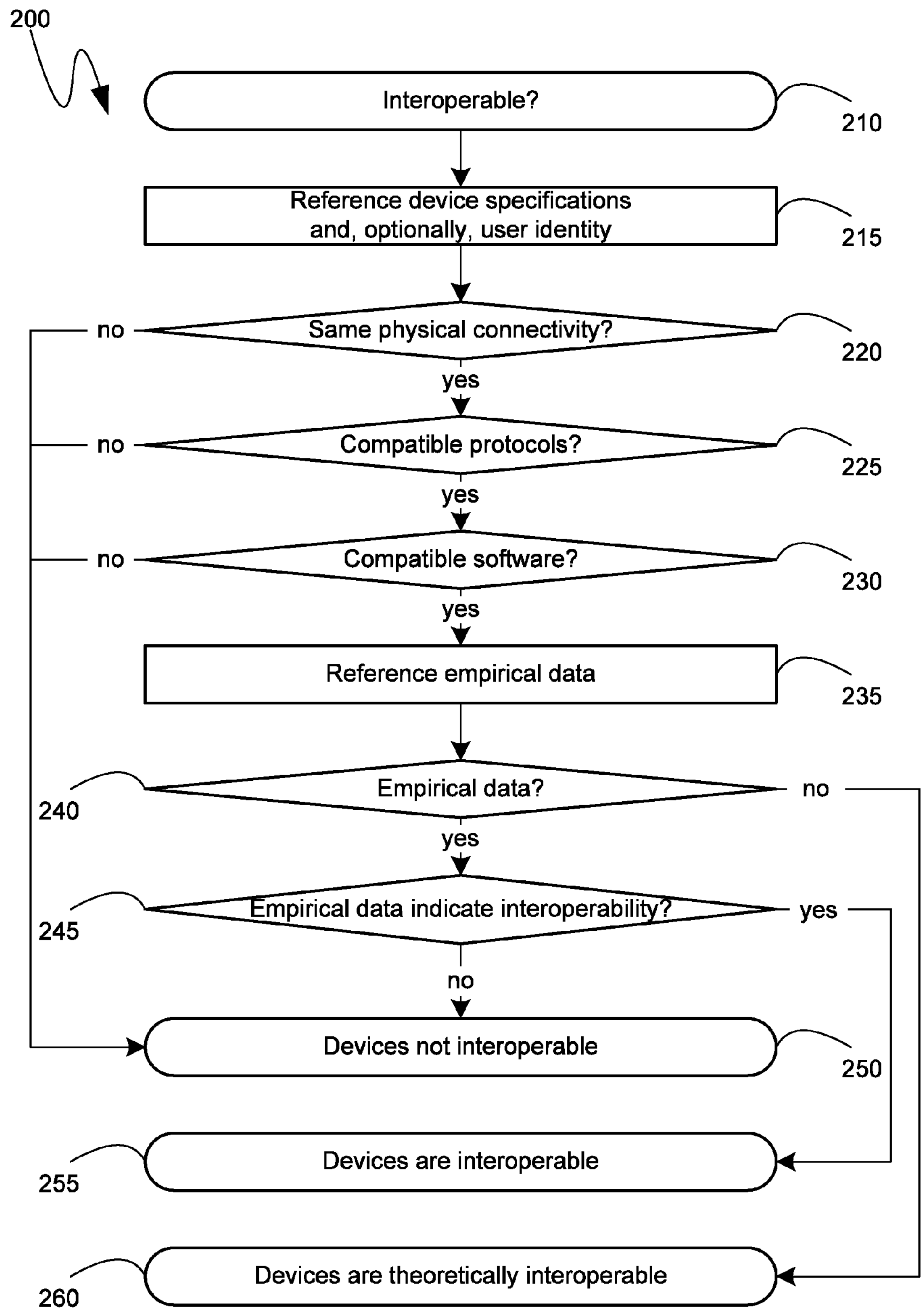
FIG. 3 is an exemplary flow diagram for providing interoperability assessments.

Turning to FIG. 3, a flow diagram 200 is shown illustrating an exemplary procedure that a computing device of the interoperability service 10, such as the server computing device 11, can implement to perform an interoperability assessment. As shown, initially, at step 210, the interoperability service 10 can receive an inquiry as to whether two or more devices are interoperable. In one embodiment, the inquiry received at step 210 can specifically identify the two or more devices for which an interoperability assessment is being requested. As indicated previously, such an identification of a device can be in the form of a manufacturer identifier, information from a UPC label, information from an RFID or other NFC tag, a marketing or model designation, or any like identification. In an alternative embodiment, only a single device need be specified as part of the request received at step 210, with the one or more other devices with which the interoperability is to be determined being part of the requesting user's, or some other user's, identity. In such a case, at step 215, in addition to referencing the device specifications 17, the server computing device 11 performing the interoperability assessment can also reference the user identity information 15.

As indicated previously, the device specifications 17 can comprise a collection of information that can be utilized by the server computing device 11 in performing an interoperability assessment. Steps 220 through 230 provide an illustrative example of such a utilization of the device specifications 17. However, as will be recognized by those skilled in the art, the precise order of steps 220 through 230 is irrelevant and the filtering performed by those steps could be performed in any order since, at each step, a determination of incompatibility can end the interoperability assessment.

For illustrative purposes, the server computing device 11 can initially, after referencing the device specifications 17 at step 215, make a determination, at step 220, if the two or more relevant devices share a common physical connection. In particular, at step 220, the server computing device 11 can determine whether the two or more relevant devices support wireless communications or, if they support hardwired connections, whether the physical connectors and connectivity options of the devices match. For example, a hard drive having only IEEE 1394b ports does not share a matching physical connection with a computing device that does not have such ports, or only has a 1394a port, which, as will be known by those skilled in the art, is different from a 1394b port.

Similar concepts can apply to wireless connections as well. In particular, wireless communications may utilize differing physical implementations or differing frequency bands. For example, some wireless devices rely on infra-red communications while others utilize high-frequency radio communications. Similarly, devices conforming to the IEEE 802.11a specification utilize the 5 GHz frequency band, while devices conforming to the IEEE 802.11b and 802.11g specifications utilize the 2.4 GHz frequency band. Colloquially, interoperability between wireless devices often refers to the communicational or security protocols implemented by the wireless communications. However, such interoperability considerations can be separately considered at step 225, since both wire-based, and wireless, communications can require compatible protocols for interoperability.

Thus, two devices that both support a common physical mechanism of wireless communications can be found to have at least a matching physical connection, even if, further analysis may reveal that the wireless protocols, such as communication or security protocols, supported by the two devices do not mach. If the physical connectivity, wireless or wire-based, is not compatible between two or more devices, a negative determination can be made a step 220, resulting in the conclusion, at step 250, that the relevant devices are not interoperable. However, if a common physical communicational connection exists between two or more devices, a positive determination can be made at step 220, enabling the server computing device 11 to consider other aspects of interoperability, such as the protocols considered at step 225.

The physical connectivity considered at step 220 can comprise, not only the type of physical connection provided, but also the abilities of that physical connection. For example, some physical connections provide for at least one pin to carry a some amount of electrical power. However, not every device having such a connection may comprise the ability to source electrical power through the connection, or to source a sufficient amount of electrical power. If one device required a specified amount of power to be sourced via a physical connection and a second device could not supply that amount of power, then, at step 220, the two devices could be determined to not have compatible physical connectivity, despite sharing the same physical connector.

Similarly, common physical connectors can be used for differing purposes. For example, a common 25-pin connector is used by some computing device and peripheral manufacturers to provide a Small Computer System Interface (SCSI) port, while other peripheral manufacturers use the same connector as a multi-channel audio connector between a control unit and an amplifier. While such devices would share the same physical connector, they may not share the same physical connectivity since, in the illustrated example, the connectors are used to implement different connectivity standards. Consequently, at step 220, a determination can be made that the implementation of differing connectivity standards means that the relevant devices do not share the same physical connectivity and, consequently, the devices are not interoperable, as would be indicated at step 250.

If, however, a determination is made, at step 220, that the two or more relevant devices have a common, or compatible, physical connectivity, then processing can continue to evaluate other aspects of interoperability. In particular, at step 225, the server computing device 11 can determine if the compatible physical connectivity of step 220 is utilized by compatible protocols. Returning to the prior example, if one of the two wireless devices referenced above supported, for example, only the Bluetooth® wireless protocol, while the other wireless device supported only wireless communications conforming to the IEEE 802.11g specification, then at step 225, a determination can be made that the two devices do not share a common, or compatible, communicational protocol. A finding of incompatible protocols at step 225 can result in a determination, at step 250, that the two devices are not interoperable. Conversely, a finding of compatible protocols at step 225 can enable the server computing device 11 to consider other interoperability issues.

As described previously, protocol considerations can include considerations of the protocol version and protocol class implementations. Some protocol versions are not compatible with other versions of the same protocol, such as, for example, wireless communications conforming, respectively, to the IEEE 802.11a and 802.11b standards. Similarly, the lack of implementation of certain classes of a protocol can impact interoperability. Thus, while a stereo headset and cellular telephone can both implement the Bluetooth® wireless protocol, the lack of implementation of the A2DP class of the Bluetooth® protocol by the cellular telephone can limit the utility of the stereo headset, since the cellular telephone would only be able to source single channel sound. Consequently, the evaluation performed by the server computing device at step 225 can take into account such version and class implementation details when comparing the communicational protocols supported by the relevant devices.

If the relevant devices are found, at step 225, to share compatible protocols, further interoperability considerations can be made by the server computing device 11 at step 230, where the software or operating instructions of the relevant devices can be considered. The software considerations of step 230 can comprise driver availability and compatibility considerations, as well as device capability considerations. Commonly, device interoperability requires that at least one device comprise some mechanism for "driving" or otherwise utilizing aspects of the other device. Within the context of traditional personal computing devices, such mechanisms were encapsulated within driver software that, in many cases, may be specifically designed for a particular operating system, or version of the operating system. Thus, at step 230, the server computing device 11 can consider whether one device includes, or has available to it, driver software for the other device, including driver software that is compatible with any operating system that may be utilized by the first device. The compatibility determination can reference issues such as the driver programming methodology, such as, for example, whether the driver was designed for a 32-bit or 64-bit operating system, driver requirements, including, for example, whether another operating system different from the one for which the driver was originally designed, could still utilize the driver, and other like concerns.

In addition to driver-focused analysis, or as an alternative to it, the server computing device 11 can, at step 230, also reference the device capabilities. For example, a digital camera and a digital scanner can both comprise the same physical connectivity, namely a USB port, and can both comprise the same communication protocols, such as the USB version 2.0 protocol. In addition, the digital camera can comprise a simple operating system that can include drivers for, for example, digital printers from the same manufacturer. However, an analysis of the digital camera's drivers can be avoided via an analysis of each device's capabilities, namely as image acquiring devices. Since one dedicated image acquiring device would likely have no need to interoperate with another dedicated image acquiring device, the server computing device can, at step 230, determine, based on each device's capabilities, that these two exemplary devices do not share compatible software and can, therefore, determine, at step 250, that the devices are not interoperable.

If the analysis of the device specifications 17, such as that exemplarily illustrated by steps 220, 225 and 230, indicates that at least some of the relevant devices may be interoperable, the server computing device 11 can, at step 235, reference the empirical data 16. If, at step 240, the server computing device 11 determines that there exists relevant empirical data, then it can evaluate that empirical data at step 245 to determine if it further defines the theoretical interoperability found by analyzing the device specifications 17. If, however, the server computing device 11 determines, at step 240, that there is no relevant empirical data, then, at step 260, it can indicate that the devices are at least theoretically interoperable, but that there is no empirical evidence of interoperability. In an alternative embodiment, the server computing device 11 could simply indicate that the devices are interoperable, as in step 255, without burdening the user of the interoperability service 10 with a distinction between theoretical and confirmed interoperability.

If, however, the server computing device 11 determines, at step 240, that there exists relevant empirical data among the empirical data 16, it can examine that empirical data to determine whether it confirms, or contradicts, the previously made theoretical interoperability assessment. As indicated above, extrapolations based on empirical data sources with a sufficiently large sampling, such as the error reporting service 60, can be used to appropriately assess reports of a lack of interoperability and to reduce the chances that the majority of silent users for whom two or more devices interoperate properly are not drowned out by a vocal minority suffering interoperability issues. Thus, for example, if the relevant empirical data indicates that there are 20 user-submitted reports of interoperability issues, and, based on a large sampling, the overall number of users owning the relevant devices is very small, the server computing device can determine, at step 245, that the empirical data indicates a lack of interoperability and can report such a lack of interoperability at step 250. In an alternative embodiment, the report provided to a user at step 250 can be more detailed, indicating that the lack of interoperability is premised based on empirical data, and even providing information regarding the empirical data, such as the ranking scores for those users who submitted the reports on which the empirical data is based. If, however, the relevant empirical data indicates that there are 20 user-submitted reports of interoperability issues but the overall number of users owning the relevant devices is quite large, the server computing device can, at step 245, discount such reports of a lack of interoperability, and can instead determine that the empirical data supports the prior theoretical conclusion of interoperability and can notify the user of such a conclusion at step 255.

Although not specifically enumerated in the flow diagram 200 of FIG. 3, the interoperability assessment provided via steps 250, 255 or 260 can be in any form convenient for, or capable of being received by, the requesting user. Thus, in one embodiment, the interoperability assessment referenced by steps 250, 255 or 260, can be provided to the requesting user via a user interface that comprises a listing of the relevant devices and an indication of their interoperability. In an alternative embodiment, the interoperability assessment can be provided in the form of a text message or other simpler interface more suitable to lower bandwidth and lower display resolution devices, such as a common cellular telephone.

As can be seen from the above descriptions, mechanisms for providing an interoperability assessment by leveraging existing data sources have been provided. In view of the many possible variations of the subject matter described herein, we claim as our invention all such embodiments as may come within the scope of the following claims and equivalents thereto.

I claim:

1. One or more computer-readable storage media comprising computer-executable instructions for performing an interoperability assessment between a first device and a second device, the computer-executable instructions directed to steps comprising:

obtaining specifications for the first device and the second device;

determining, based on the specifications, a theoretical interoperability between the first device and the second device, the determining the theoretical interoperability comprising: determining, based on the specifications, whether the first device and the second device comprise physical connectivity compatible with one another; determining, based on the specifications, whether the first device and the second device support communication protocols compatible with one another; and determining, based on the specifications, whether the first device or the second device can execute instructions directed to interoperating with the other;

searching for empirical evidence of interoperability between the first device and the second device; and providing the interoperability assessment between the first device and the second device based on the theoretical interoperability and the empirical evidence of interoperability.

2. The computer-readable storage media of claim 1, wherein the empirical evidence of interoperability comprises an extrapolation of use of the first and second devices across a population of users.

3. The computer-readable storage media of claim 1, wherein the specifications for the first device and the second device, and the empirical evidence of interoperability are supplemented by pre-existing, independently created and maintained external data sources.

4. The computer-readable storage media of claim 1, wherein the specifications for the first device or the second device or the empirical evidence of interoperability are provided by a user having a ranking associated with the user's prior provisions' accuracy.

5. The computer-readable storage media of claim 1, wherein the first device is specified by a user requesting the interoperability assessment and the second device is a device pre-associated with the user in a user identity.

6. The computer-readable storage media of claim 1, wherein the first device is specified by a first user requesting the interoperability assessment and the second device is a device pre-associated with a second user in a user identity, wherein the providing the interoperability assessment comprises concealing, from the first user, identifying information of the second device.

7. A method for performing an interoperability assessment between a first device and a second device, the method comprising the steps of:

obtaining specifications for the first device and the second device;

determining, based on the specifications, a theoretical interoperability between the first device and the second device, the determining the theoretical interoperability comprising: determining, based on the specifications, whether the first device and the second device comprise physical connectivity compatible with one another; determining, based on the specifications, whether the first device and the second device support communication protocols compatible with one another; and determining, based on the specifications, whether the first device or the second device can execute instructions directed to interoperating with the other;

searching for empirical evidence of interoperability between the first device and the second device; and providing the interoperability assessment between the first device and the second device based on the theoretical interoperability and the empirical evidence of interoperability.

8. The method of claim 7, wherein the empirical evidence of interoperability comprises an extrapolation of the use of the first and second devices across a population of users.

9. The method of claim 7, wherein the specifications for the first device and the second device, and the empirical evidence of interoperability are supplemented by pre-existing, independently created and maintained external data sources.

10. The method of claim 7, wherein the specifications for the first device or the second device or the empirical evidence of interoperability are provided by a user having a ranking associated with the user's prior provisions' accuracy.

11. The method of claim 7, wherein the first device is specified by a user requesting the interoperability assessment and the second device is a device pre-associated with the user in a user identity.

12. The method of claim 7, wherein the first device is specified by a first user requesting the interoperability assessment and the second device is a device pre-associated with a second user in a user identity, wherein the providing the interoperability assessment comprises concealing, from the first user, identifying information of the second device.

13. A system for providing an interoperability assessment between a first device and a second device, the system comprising:

device specifications for the first device and the second device;

empirical interoperability data associated with the first device and the second device; and user identity data associating a user to one or more devices; and a computing device for utilizing the device specifications to determine a theoretical interoperability between the first device and the second device and for utilizing the empirical interoperability data for refining the theoretical interoperability, wherein the determining the theoretical interoperability comprises: determining, based on the specifications, whether the first device and the second device comprise physical connectivity compatible with one another; determining, based on the specifications, whether the first device and the second device support communication protocols compatible with one another; and determining, based on the specifications, whether the first device or the second device can execute instructions directed to interoperating with the other;

wherein the empirical interoperability data and the user identity data are supplemented by pre-existing, independently created and maintained external data sources.

14. The system of claim 13, wherein the empirical interoperability data is supplemented by data collected as part of an automated error reporting mechanism.

15. The system of claim 13, wherein the device specifications for the first device or the second device or the empirical interoperability data are provided by a user having a ranking associated with the user's prior provisions' accuracy.

16. The system of claim 13, wherein the first device is specified by a first user requesting the interoperability assessment and the second device is part of the first user's user identity data.

17. The system of claim 13, wherein the first device is specified by a first user requesting the interoperability assessment and the second device is part of a second user's user identity data, wherein the interoperability assessment provided to the first user comprises concealing, from the first user, identifying information of the second device.

* * * * *